(12) United States Patent
Smith et al.

(10) Patent No.: US 11,799,320 B2
(45) Date of Patent: Oct. 24, 2023

(54) MULTI-DEVICE WIRELESS DEVICES, SYSTEMS, AND METHODS OF USE THEREOF

(71) Applicant: HONDA MOTOR CO., LTD., Tokyo (JP)

(72) Inventors: Caleb Andrzejek Smith, Chicago, IL (US); Michael George, Raymond, OH (US); Jason Dutter, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 16/864,993

(22) Filed: May 1, 2020

(65) Prior Publication Data
US 2021/0344226 A1 Nov. 4, 2021

(51) Int. Cl.
*H02J 50/00* (2016.01)
*H02J 50/80* (2016.01)
(Continued)

(52) U.S. Cl.
CPC ............ *H02J 50/005* (2020.01); *H02J 50/10* (2016.02); *H02J 50/40* (2016.02); *H02J 50/80* (2016.02)

(58) Field of Classification Search
CPC ...... H02J 50/10; H02J 7/00045; H02J 7/0047; H02J 7/02; H02J 50/80; H02J 50/90;
(Continued)

(56) References Cited

U.S. PATENT DOCUMENTS

| 7,072,699 B2 | 7/2006 | Eiden |
| 7,695,148 B1 | 4/2010 | Davis |

(Continued)

FOREIGN PATENT DOCUMENTS

| CN | 207994733 U | 10/2018 | |
| CN | 208063276 U | * 11/2018 | ............. H02J 50/00 |

(Continued)

OTHER PUBLICATIONS

Notice of Reasons for Rejection dated Apr. 12, 2022, issued by the Japanese Patent Office in related Japanese Patent Application No. 2021-065599.

*Primary Examiner* — Edward Tso
*Assistant Examiner* — Ahmed H Omar
(74) *Attorney, Agent, or Firm* — ArentFox Schiff LLP

(57) ABSTRACT

A multi-device wireless charger may include a charging surface disposed onto a housing structure, wherein the housing structure includes coils or other induction generating features and other electronic components that enable wireless charging via electromagnetic induction. Further, the housing structure may also include adjustable securing features, such that the multi-device wireless charger may be adjusted to accommodate more than one type of wirelessly chargeable mobile device. In one example, the securing features may include a tambour sliding surface disposed over the charging surface, positionable via a protruding member. In another example, the securing features may include at least pairs of cooperating sliding armatures. In another example, the securing features may include at least two spring-loaded sliding mechanisms configured to interoperate with a stabilizing member via spring mechanisms. The method may involve adjusting the securing features and then securing the device.

16 Claims, 16 Drawing Sheets

(51) Int. Cl.
*H02J 50/40* (2016.01)
*H02J 50/10* (2016.01)

(58) Field of Classification Search
CPC .. H02J 5/005; H02J 7/025; H02J 3/322; H02J 7/0013; H02J 7/0014; H02J 7/0016; H02J 7/0018; H02J 7/0019; H02J 7/0024; H02J 7/0025; H02J 7/0042; H02J 7/0044; H02J 7/0045; H02J 2310/22; H02J 2310/40; H02J 2310/42; H02J 2310/44; H02J 2310/46; H02J 2310/48; H02J 7/0003
USPC .......................................................... 320/108
See application file for complete search history.

(56) References Cited

U.S. PATENT DOCUMENTS

| | | | |
|---|---|---|---|
| 7,746,028 B1* | 6/2010 | Yang | H04M 1/05 |
| | | | 320/114 |
| 8,076,902 B2 | 12/2011 | Sip et al. | |
| 8,164,222 B2 | 4/2012 | Baarman | |
| 8,373,310 B2* | 2/2013 | Baarman | H02J 50/10 |
| | | | 452/107 |
| 8,567,737 B2 | 10/2013 | Chen | |
| 8,816,636 B2 | 8/2014 | Shinde et al. | |
| 9,059,592 B2 | 6/2015 | Fan | |
| 9,077,191 B2 | 7/2015 | Pieker | |
| 9,142,976 B2 | 9/2015 | Chen | |
| 9,397,718 B2* | 7/2016 | Lachnitt | H02J 50/10 |
| 9,680,517 B2 | 6/2017 | Ben Abdelaziz | |
| 10,135,304 B2* | 11/2018 | Jung | H02J 50/12 |
| 2013/0206945 A1* | 8/2013 | Chen | F16M 13/00 |
| | | | 248/316.4 |
| 2013/0271070 A1 | 10/2013 | Hirano | |
| 2015/0229345 A1 | 8/2015 | Lachnitt | |
| 2016/0297383 A1* | 10/2016 | Pike | B60N 2/90 |
| 2017/0110902 A1 | 4/2017 | Miller et al. | |

FOREIGN PATENT DOCUMENTS

| | | | | |
|---|---|---|---|---|
| DE | 102005058636 A1 | | 6/2007 | |
| DE | 102015222685 A1 | | 5/2017 | |
| JP | 2015-181321 A | | 10/2015 | |
| KR | 200443360 Y1 | | 2/2009 | |
| KR | 20120075976 A | * | 2/2012 | ........... H05K 5/0217 |
| KR | 20150028132 A | | 3/2015 | |
| WO | WO 2015/077239 A1 | | 5/2015 | |
| WO | WO 2019/049056 A1 | | 3/2019 | |

\* cited by examiner

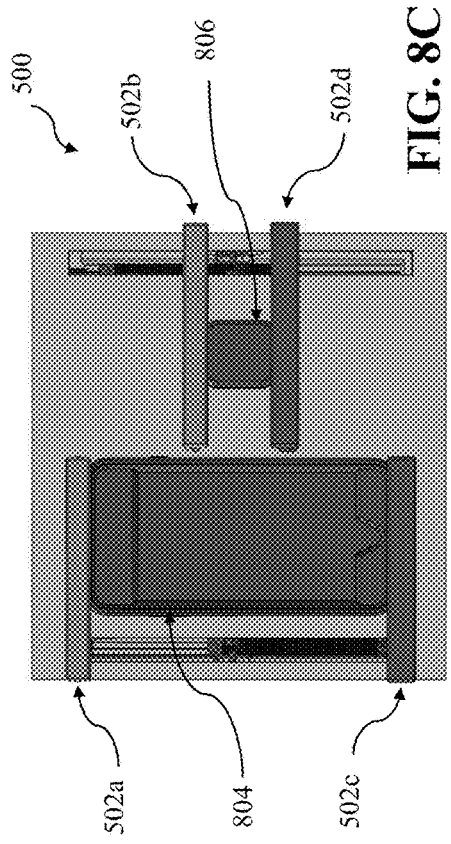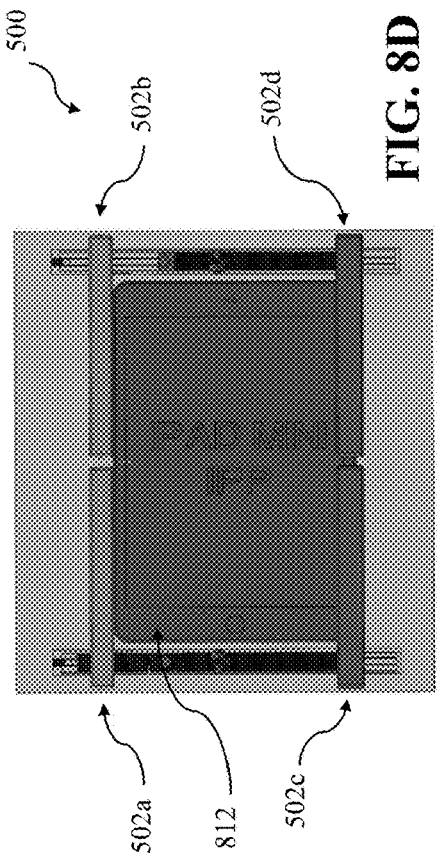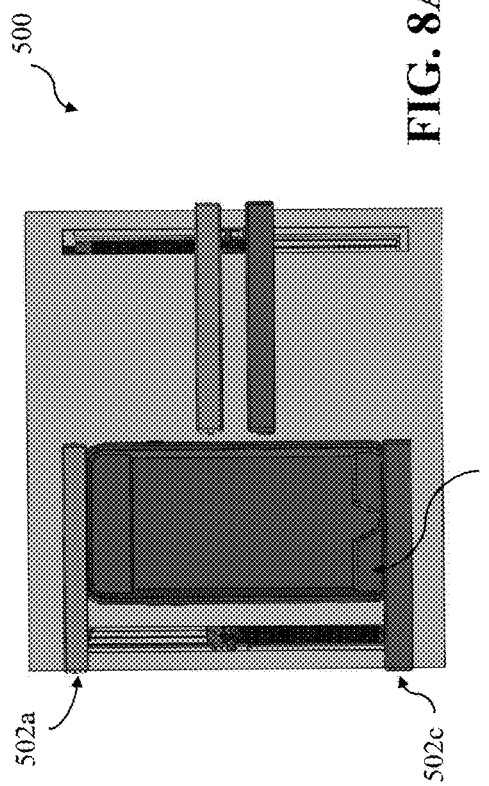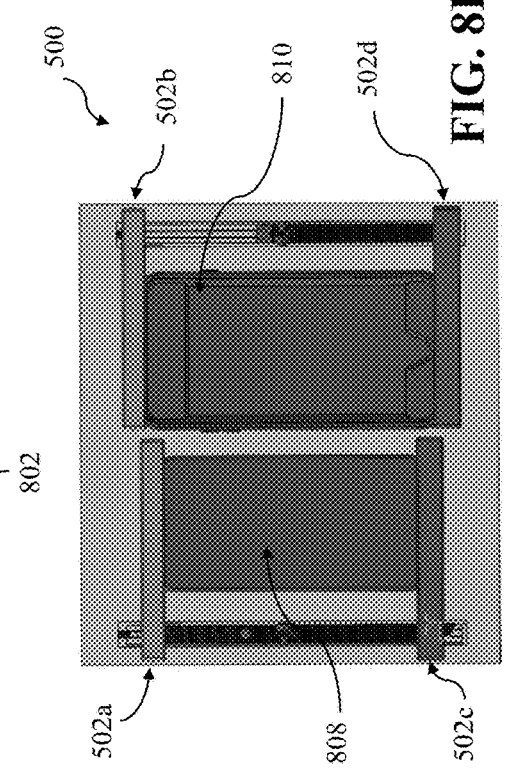

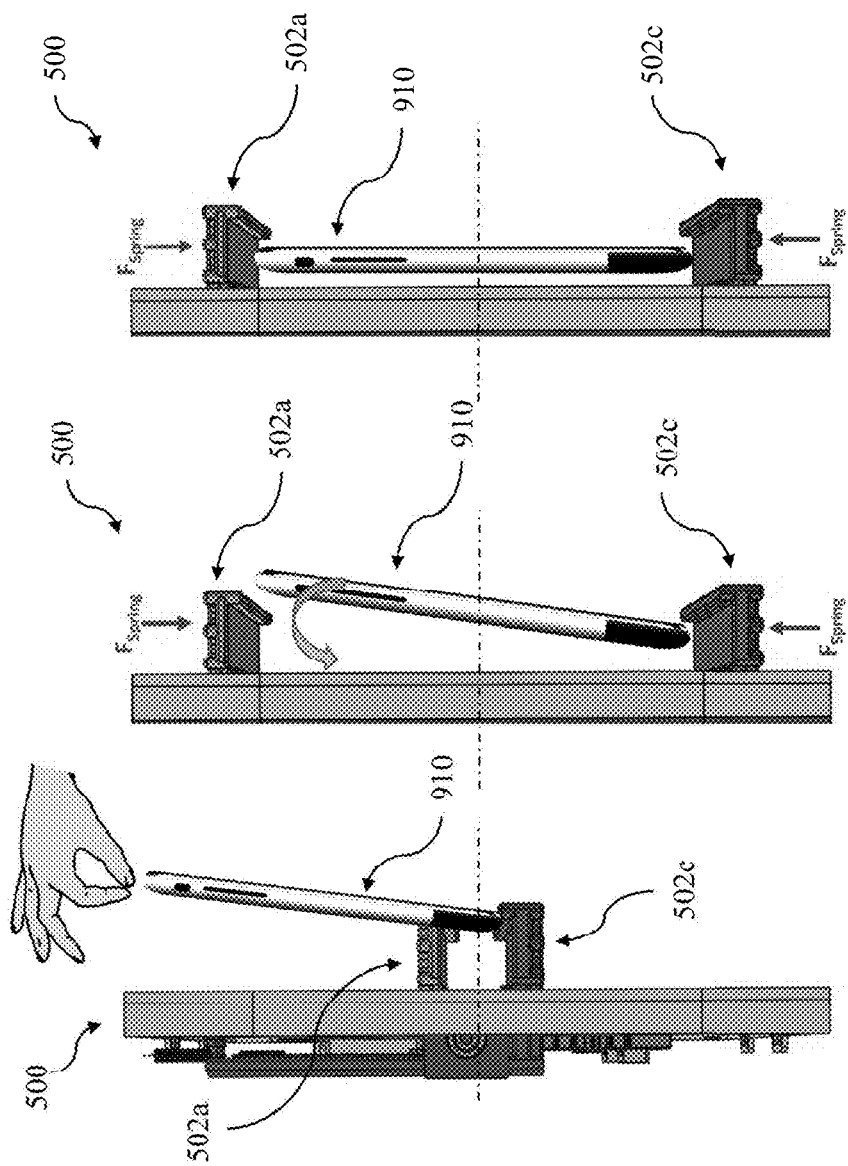

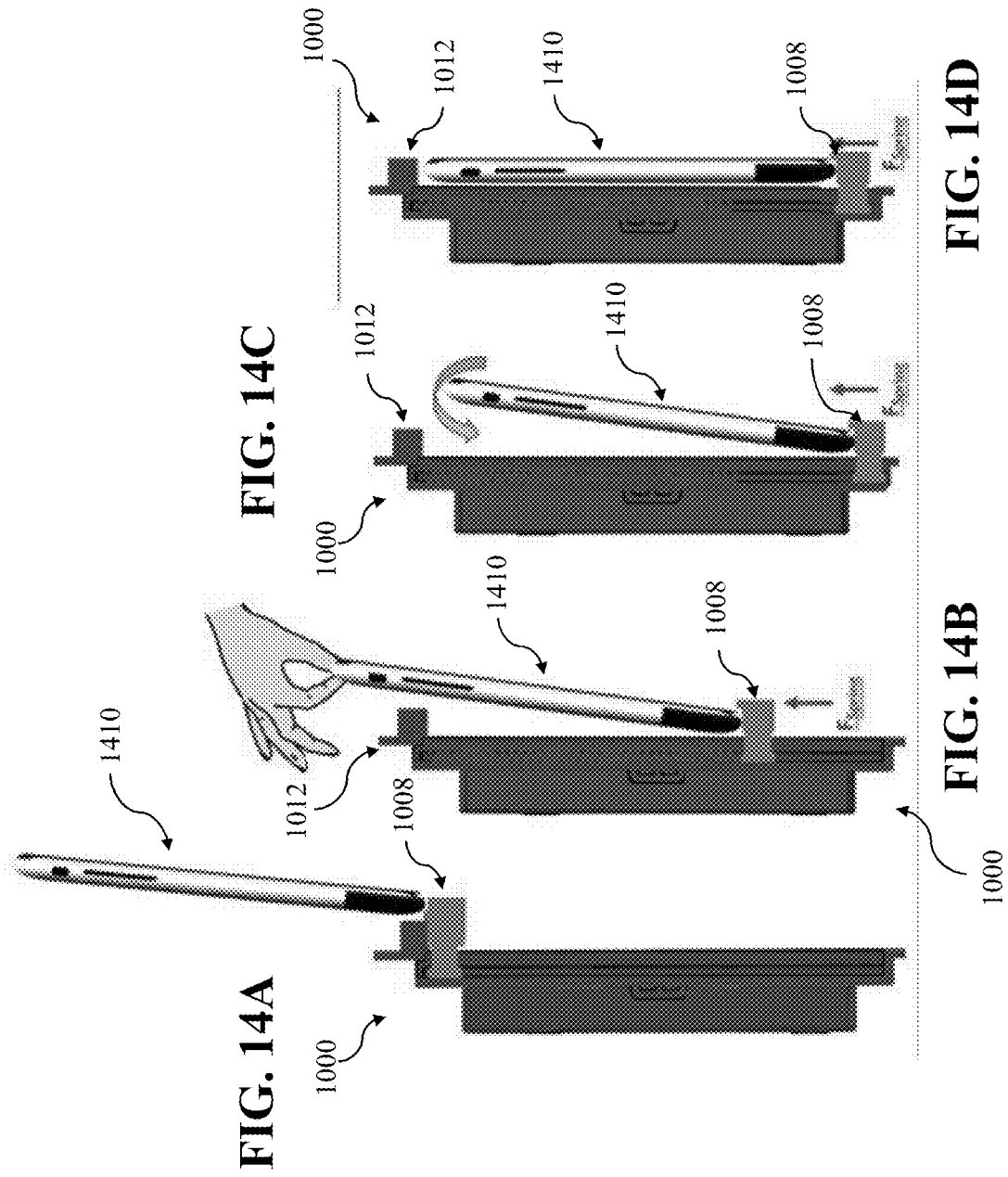

MULTI-DEVICE WIRELESS DEVICES, SYSTEMS, AND METHODS OF USE THEREOF

BACKGROUND

Field

Aspects of the present disclosure relate to multi-device wireless chargers implementable in a variety of environments, such as in vehicles, and methods of use thereof.

Background of the Technology

The earliest version of the modern a smart phone was released commercially by IBM in 1994, and was capable of receiving and sending faxes, emails, and cellular calls, among other things. However, with the exponential scaling and miniaturization of metal-oxide-semiconductor field effect transistors in combination with the development of the Internet, smart phones quickly became integrated into everyday life within the fabric of society. Likely because of their portability, the introduction of smart phones began to reduce the number of household landline systems in addition to a plurality of other devices, such as calculators, portable music players, etc., at least in part because such a wide variety of functions could be incorporated into the smart phone. For example, the use of paper maps or standalone Global Positioning System (GPS) navigation devices when driving was soon replaced by the use of Internet-connected mapping and navigating programs that began to be standard in almost all smart phones. In another example, smart phones replaced traditional radio technology or portable music players as, in some instances, they became the preferred medium for playing music, podcasts, and other audio media, especially in mobile environments, including in vehicles or airplanes.

Thus, at least in part because of the increase in smart phone use within vehicle environments, there has been a similar increase in the demand for and production of a variety of different charging methods implementable within environments where wall-plug charging is available. However, the use of map and music on smart phones has resulted in an increase in the number of car accidents, some of which are fatal, at least in part because it is common for the driver to take their eyes off of the road when attempting to operate the device. Thus, there has been a similar increase in demand for devices that hold a smart phone device in place, such that a driver may at least look at directions without need to look at their lap or in any other location that would require loss of attention on the road on which they are driving.

In the related art, there are examples of devices that combine wireless charging technology with smart phone positioning devices for implementation within vehicle environments. For example, there are devices that may be attached to the inside of the windshield such that a phone may be clipped into place, wherein the platform that holds the device is configured to charge with smart phone wirelessly. However, these devices are limited in their configuration. Specifically, only a single wirelessly-chargeable device may be clipped in at a time, and the device may be configured to accommodate only one unique commercial embodiment of a smart phone, or a small range of commercial embodiments. Further, these devices are not capable of charging or holding other wirelessly chargeable devices, such as tablets and headphones.

Thus, responsive to the problems described above, as well as others, there exists an unmet need in the related art for a multi-device wireless charging system and methods of use thereof, for implementation in a wide variety of environments, such as in vehicles.

SUMMARY

Consequent of the deficiencies described above, as well as others, there remains an unmet need for a wireless charging device capable of contemporaneously charging multiple similar or dissimilar devices in a variety of environments, such as in vehicles.

In view of such problems and shortcomings, aspects of the present disclosure relate, among other things, to multi-device wireless charging devices, systems, and methods of use thereof. An example multi-device wireless charger, according to various aspects, may include a charging surface disposed within a housing structure, wherein the housing structure may house electronic or technological equipment necessary to enable wireless charging, such as receiving coils and/or other features necessary to enable wireless charging via electromagnetic induction. Further, the housing structure may also include adjustable securing features, wherein the adjustable securing features facilitate the adjustment of the multi-device wireless charger to securely accommodate at least two wirelessly chargeable mobile devices, including where the at least two devices are disparate devices. In one example, the adjustable securing features may include a tambour sliding surface disposed on top of the charging surface, such that the tambour sliding surface comprises a larger surface area than the charging surface and where extending portions of the tambour sliding surface are configured to be stored by within the charging device, such as underneath the charging surface. The securing may further include an adjusting mechanism, wherein the adjusting mechanism is attached to the tambour sliding surface such that the adjusting mechanism bifurcates the tambour sliding surface. The adjusting mechanism may be used to adjust the tambour sliding surface to contemporaneously accommodate one or more wirelessly chargeable mobile devices, such as one or more smart phones, tablets, or earbud charger devices. In another example, the securing features may include at least two spring-loaded pinching mechanisms or other securing features, along with a dividing member, the dividing member being configured to bifurcate the charging surface. A spring-loaded pinching mechanism may be located on either or both sides of the dividing member, for example. In yet another example, the securing features may include at least two spring-loaded sliding mechanisms, the at least two spring-loaded sliding mechanisms each being configured to interoperate with a stabilizing member via at least two springs. The securing features may facilitate the contemporaneous wireless charging of at least two wirelessly chargeable devices, for example, allowing for the continued use and operation of those devices in mobile settings, such as in a vehicle or airplane.

Further, according to various aspects of the present disclosure, a method for using a multi-device wireless charging system may include adjusting the securing features depending on the size, shape, and/or packaging of each of the wirelessly chargeable device(s) interoperating therewith and securing each wirelessly chargeable device within the multi-device wireless charging system relative to the charging surface. In one example, a tambour sliding surface may be positioned using a protruding member, wherein a wirelessly chargeable device may then be positioned on the sliding tambour surface and secured via a clip, retainer, or other similar device gripping mechanism. In another example, a spring-loaded pinching mechanism may be adjusted relative to a wireless charging surface with a wirelessly chargeable device, wherein the wirelessly chargeable device is then, for example, placed on the charging surface and secured by the spring-loaded gripping mechanism relative to the charging surface. In yet another example, a spring-loaded sliding mechanism may be adjusted relative to a wireless charging surface to accommodate the wirelessly chargeable device, wherein the wirelessly chargeable device is then inserted relative to and secured by the interoperation of the spring-loaded sliding mechanism, a spring mechanism, and a stabilizing member.

Additional advantages and novel features of these aspects will be set forth in part in the description that follows, and in part will become more apparent to those skilled in the art upon examination of the following or upon learning by practice of the disclosure.

BRIEF DESCRIPTION OF THE FIGURES

FIGS. 8A-8D illustrate example views of multiple wirelessly chargeable devices interoperable with the example multi-device wireless charger with sliding armatures of FIG. 5, according to aspects of the present disclosure.

FIGS. 9A-9C illustrate side views of various positions of a an example device engaged with a multi-device wireless charger implementing a plurality of sliding armatures, according to aspects of the present disclosure.

FIGS. 14A-14D illustrate a side views of an example device engaged with a multi-device wireless charger implementing a spring-loaded sliding mechanism, according to aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Throughout the disclosure, the term approximately may be used as a modifier for a geometric relationship among elements or for the shape of an element or component. While the term approximately is not limited to a specific variation and may cover any variation that is understood by one of ordinary skill in the art to be an acceptable variation, some examples are provided as follows. In one example, the term approximately may include a variation of less than 10% of the dimension of the object or component. In another example, the term approximately may include a variation of less than 5% of the object or component. If approximately is used to define the angular relationship of one element to another element, one non-limiting example of the term approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein is installed an in an in-use orientation. Further, in order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

Figure 1:
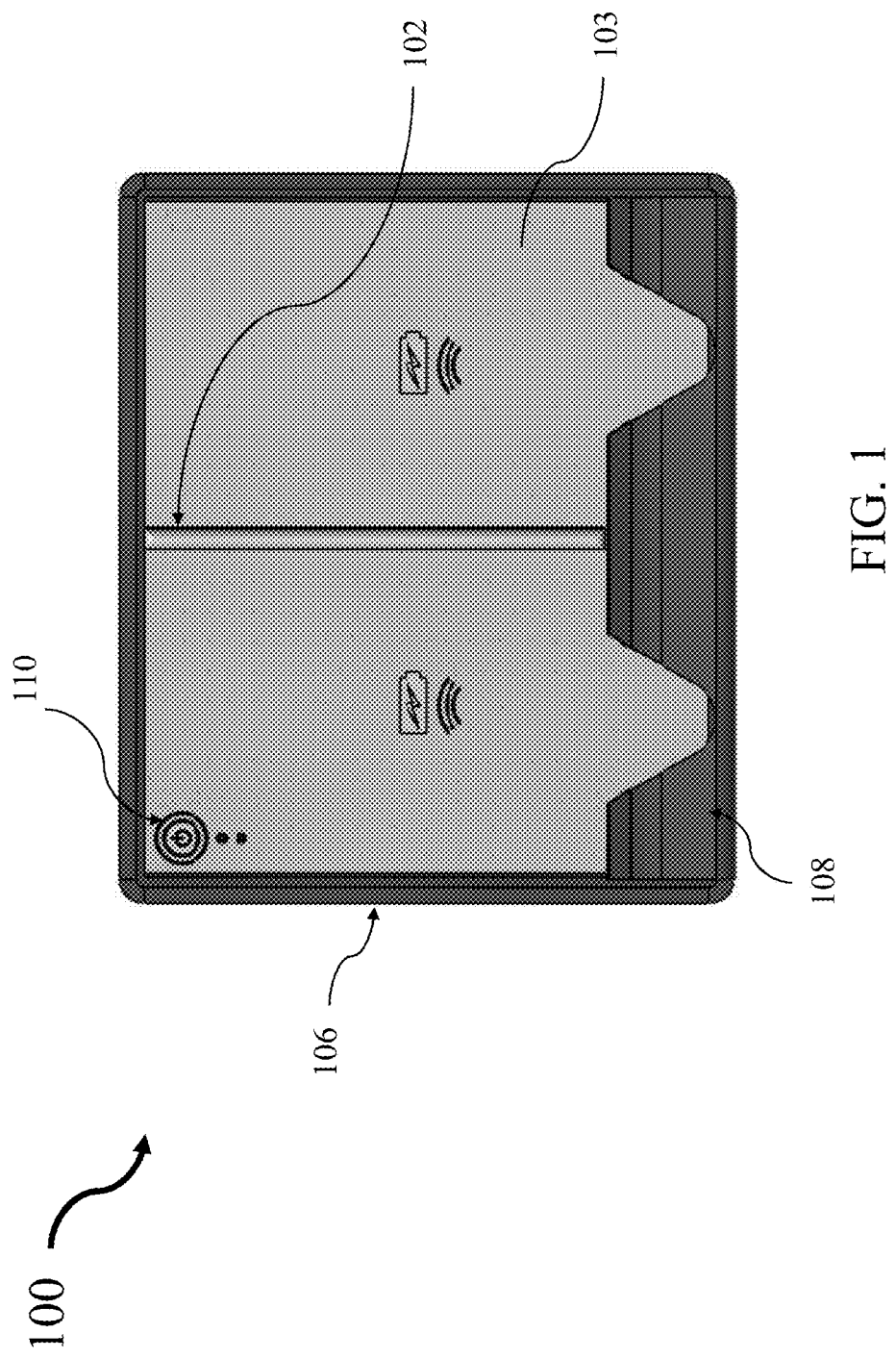
FIG. 1 illustrates a first view of an example multi-device wireless charger implementing a sliding tambour mechanism, the view being normal to a charging surface of the charger, according to aspects of the present disclosure.

According to aspects of the present disclosure, FIG. 1 illustrates various features of an example multi-device wireless charger 100, wherein charger 100 comprises a charging surface 104, wherein charging surface 104 may be configured to wirelessly charge multiple different wirelessly chargeable devices that have disparate shapes and/or employ differing packaging or other features, such as wireless earphone bud cases, smart phones, or tablets, for example, via placement on or near charging surface 104. Charging surface 104 may be configured to enable inductive charging of devices configured to be charged via electromagnetic induction, for example. In one example implementation, surface 104 may operate under the Qi standard, wherein a Qi standard based system may include two components, a base station, wherein the base station is connected to a power source and provides power with regard to a second component (e.g., a mobile device), wherein the mobile device is not connected directly to a power source and may consume the inductive power for charging thereof. In this system, the base station may include a power transmitter, wherein the power transmitter includes a transmitting coil or other feature that generates an oscillating or otherwise varying magnetic field. Further, the mobile device may include a power receiver, wherein the power receiver may comprise a receiving coil or other induction receiving component for receiving power or energy from the base station transmitter. In one example, inductive charging surface 104 may require direct alignment of the coil or other induction receiving feature of the mobile device and the transmitting coil of the base station. However, other example implementations may not require direct alignment of the receiving coil and the transmitting coil in order to enable wireless charging. For example, other such implementations may have features or arrangements capable of enabling wireless charging, wherein the base station includes a plurality of variably arranged transmitting coils, and/or the mobile device may include a plurality of receiving coils.

Figure 2:
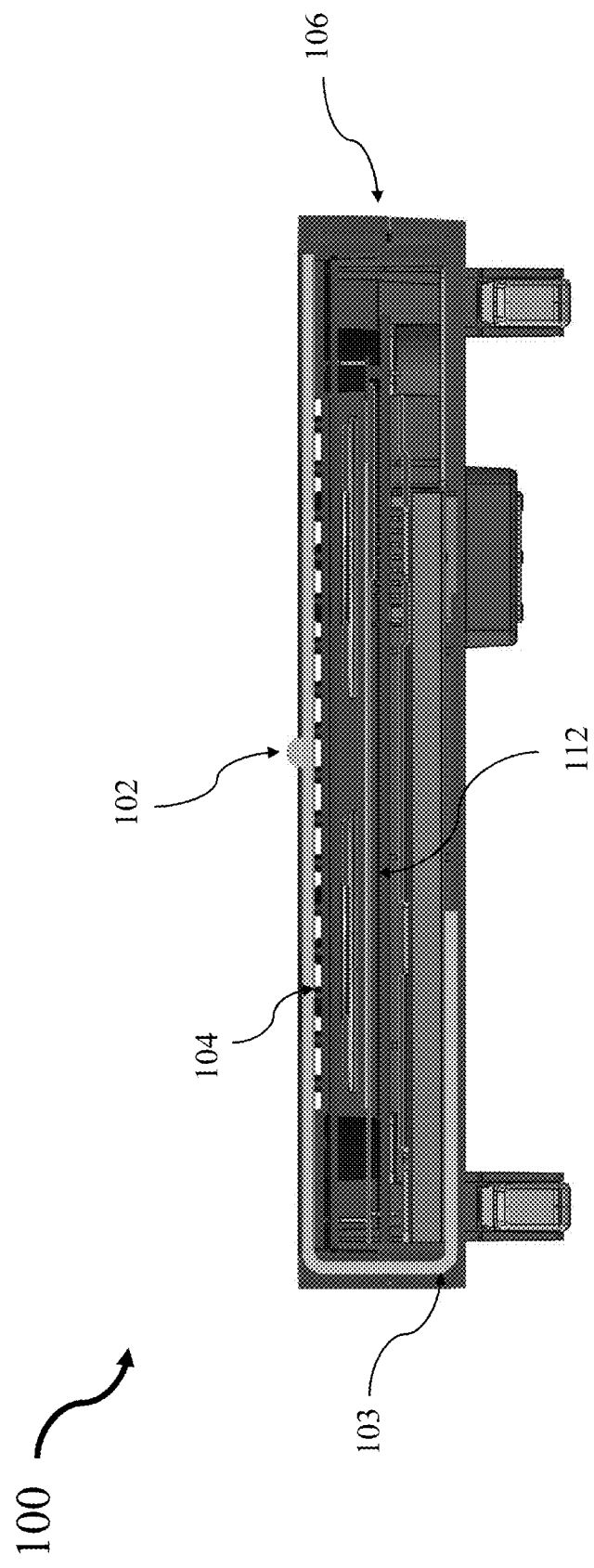
FIG. 2 illustrates a cross-sectional side view of an example multi-device wireless charger implementing a sliding tambour mechanism, according to aspects of the present disclosure.

Further, charger 100 of FIG. 1 also includes an adjusting module 102 affixed to or otherwise interoperable with tambour sliding surface 103. Adjusting module 102 may be or include a rib, such as illustrated in FIG. 1, however, adjusting module 102 may also be or include a protrusion, a plurality of protrusions, a recess, or a plurality of recesses, or other similar feature or features, wherein adjusting module 102 may have features that readily facilitate adjustment of the position of tambour sliding surface 103 by a user. Further, as also shown with reference to FIG. 2, charging surface 104 may be disposed on a housing structure 106 and tambour sliding surface 103 may additionally be disposed on a top side of charging surface 104 when the charger 100 is placed in a position for use by placement of devices thereon. Tambour sliding surface 103 may be configured to slide, such that adjusting module 102 may divide charging surface 104 into at least two distinct sections, wherein the at least two distinct sections may be varied in size to comprise a range of different relative surface areas. Thus, tambour sliding surface 103 may be larger in surface area in comparison to charging surface 104, wherein portions of tambour sliding surface 103 that are not disposed on top of charging surface 104 (depending on the position of the adjusting module 102) may wrap around or underneath charging surface 104, as shown in FIG. 2. Consequently, tambour sliding surface 103 may comprise a sufficiently flexible material to facilitate such movement and operation.

Further, housing structure 106 may be configured to house a variety of electronic and/or other functional components 112, wherein such technology components 112 may be configured to enable wireless charging via charging surface 104. Technology components 112 may include transmitting coils or other similar electromagnetic induction transmitting component configured to transmit electromagnetic power via induction, a control unit, wherein the control unit may include a processor and a memory, a battery, etc. Further, a clipping member 108 may be fixed to housing structure 106, wherein clipping member 108 may be configured to facilitate securing charger 100 to a variety of different surfaces, such as a dashboard or console in a vehicle. Thus, clipping member 108 may comprise a sufficiently rigid material, such as plastic, metal, glass, or some combination thereof. In one example, charger 100 may begin charging a wirelessly chargeable device immediately upon placement on tambour sliding surface 103. However, as illustrated in FIG. 1, charger 100 may alternatively include a power switch 110 that may be configured to selectively cause operation of the inductive charging when pressed, turned, flipped, etc. This configuration may allow the user to control if and/or when a wirelessly chargeable device is being charged, for example, permitting charger 100 to hold a wirelessly chargeable device even if the device that would otherwise be damaged if charged further (in the absence of such control).

FIG. 2, according to various aspects, illustrates a cross-sectional side view of charger 100, wherein charger 100 includes housing structure 106, wherein housing structure 106 houses technology components 112. Further, FIG. 2 illustrates tambour sliding surface 103 configured to be at least partially positioned on top of charging surface 104, wherein the relative portions and/or position of tambour sliding surface 103 may be adjusted relative to charging surface 104. The portion of tambour sliding surface 103 not positioned on top of charging surface 104 may be configured, for example, to wrap underneath charging surface 104 and technology components 112, such that tambour sliding surface 103 does not extend beyond or outside of housing structure 106. Thus, in order to facilitate such positioning and movement, tambour sliding surface 103 may comprise a sufficiently flexible material or a ribbed inflexible material, for example, such that tambour sliding surface 103 may flex via an accordion-like movement.

Figure 3:
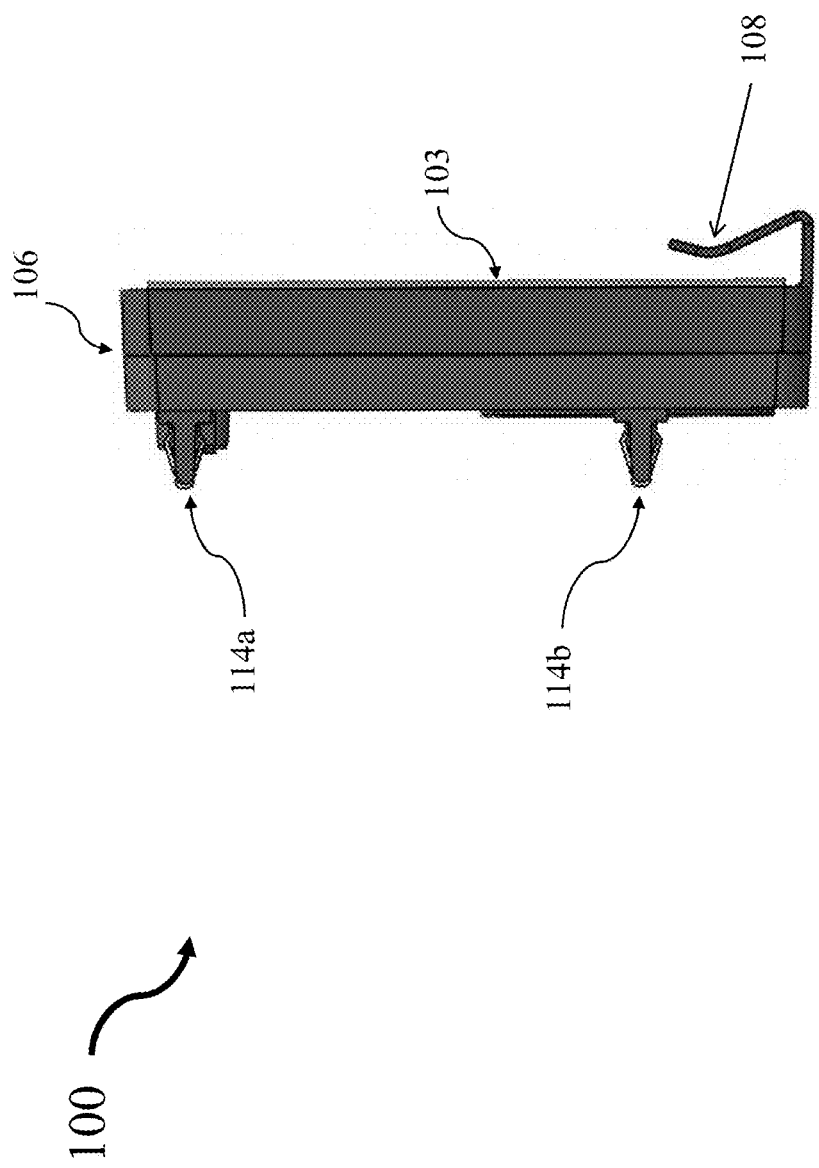
FIG. 3 illustrates a view of an example multi-device wireless charger implementing a sliding tambour mechanism and a fastening clip, the view being normal to the side of the charger, according to aspects of the present disclosure.

According to various aspects of the present disclosure, FIG. 3 illustrates a side view of charger 100, wherein charger 100 further includes clipping member 108, a first attaching mechanism 114a and a second attaching mechanism 114b. Attaching mechanisms 114a, 114b may be configured to facilitate the secure placement of charger 100 in a variety of different environments. In one example, attaching mechanisms 114a, 114b may have or include a clip or clips (not shown in FIG. 3), such that the clip or clips are capable of securing charger 100 onto or into a center console in a vehicle environment. However, in alternative example implementation, attaching mechanisms 114a, 114b may include suction devices, magnetic elements, and/or other securing features that may be used to fixably attach the console to a dashboard or other similar surface in a vehicle or non-vehicle environment, such as in an airplane cockpit.

Figure 4:
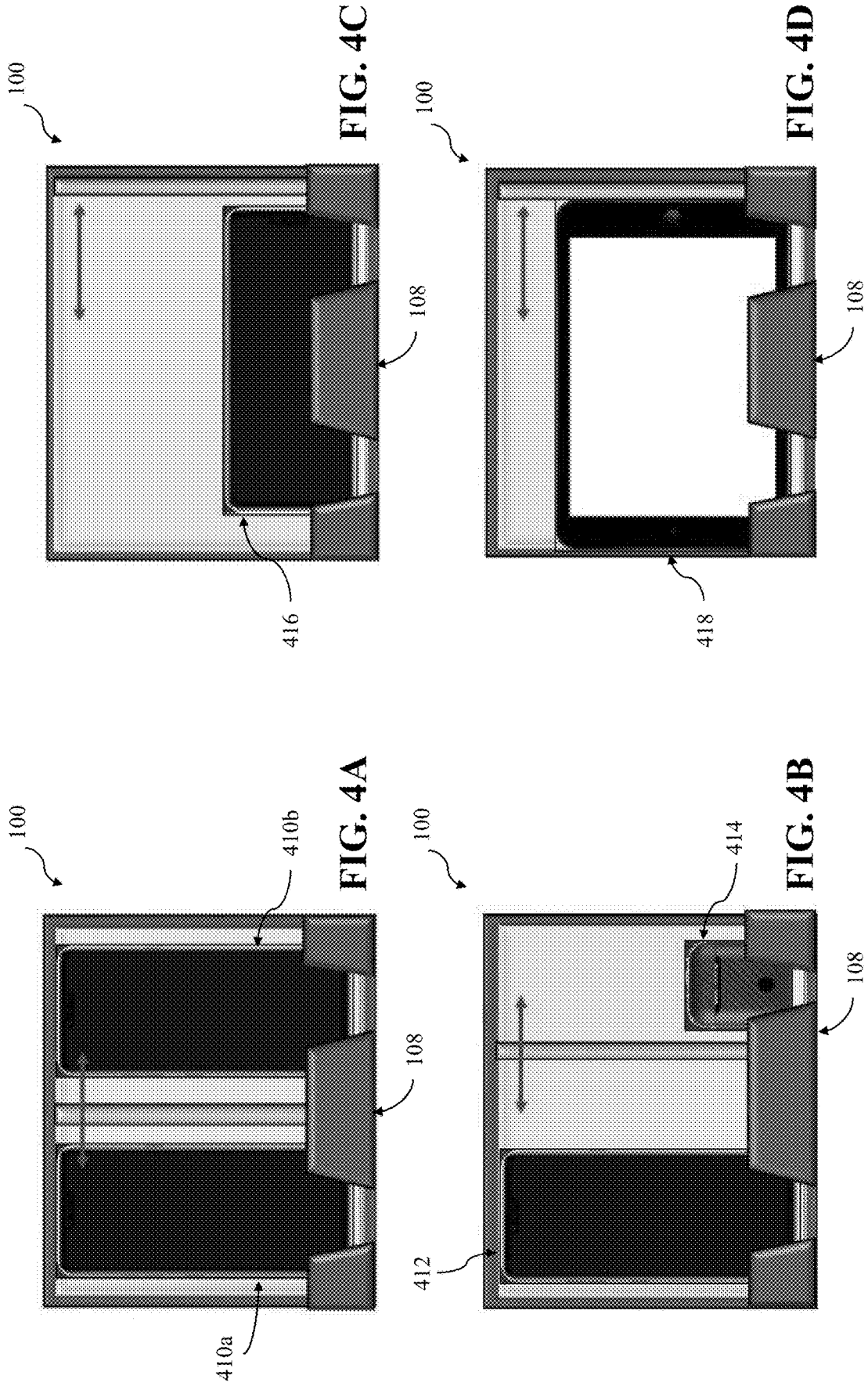
FIG. 4A-4D illustrate example variations in the configuration of the charging surface for use with multiple disparate wirelessly chargeable devices via operation of a sliding tambour mechanism and other features, according to aspects of the present disclosure.

According to various aspects, FIGS. 4A-4D illustrate a plurality of views of an example wirelessly chargeable devices positioned for interoperable engagement with charger 100. Specifically, FIG. 4A illustrates an example configuration for emplacement and/or charging a first smart phone device 410a and a second smart phone device 410b contemporaneously. For example, as shown in FIG. 4A, adjusting module 102 may be located approximately in the center of charging surface 106. Further devices 410a-410b may be secured into charger 100 via one or more clip portions 108, such that device 410a may securably interoperate with charging surface 104.

FIG. 4B illustrates another example configuration, wherein a smart phone device 412 and an earbud charging device 414 are contemporaneously positioned for charging. In configuration 404, adjusting module 102 may be selectively positioned such that adjusting member unequally dividing charging surface 106, so that smart phone device 412 and earbud charging device 414 may be wirelessly charged contemporaneously. Similarly to configuration 402, configuration 404 allows for devices 412 and 414 to be securely fashioned to charging surface 106 via one or more clip portions 108.

FIG. 4C illustrates yet another example configuration, wherein adjusting module 102 may be positioned to one side of surface 106 so as not to interference with secure retention of smart phone device 416 via clip portions 108. This positioning of adjusting module 102 allows for device 416 to be secured within charger 100, such that device 416 may be securably interoperable with charging surface 104.

Similar to the configuration of FIG. 4C, FIG. 4D illustrates an example configuration wherein a tablet device 418 is secured within charger 100 via clip portions 108, and adjusting module 102 is positioned to one side of charging surface 104 so as not to interference with secured device 418. Taken in combination, FIGS. 4A-4D illustrate that a variety of wirelessly chargeable devices may be interoperable with charger 100, either one device at a time, or multiple devices contemporaneously.

Figure 5:
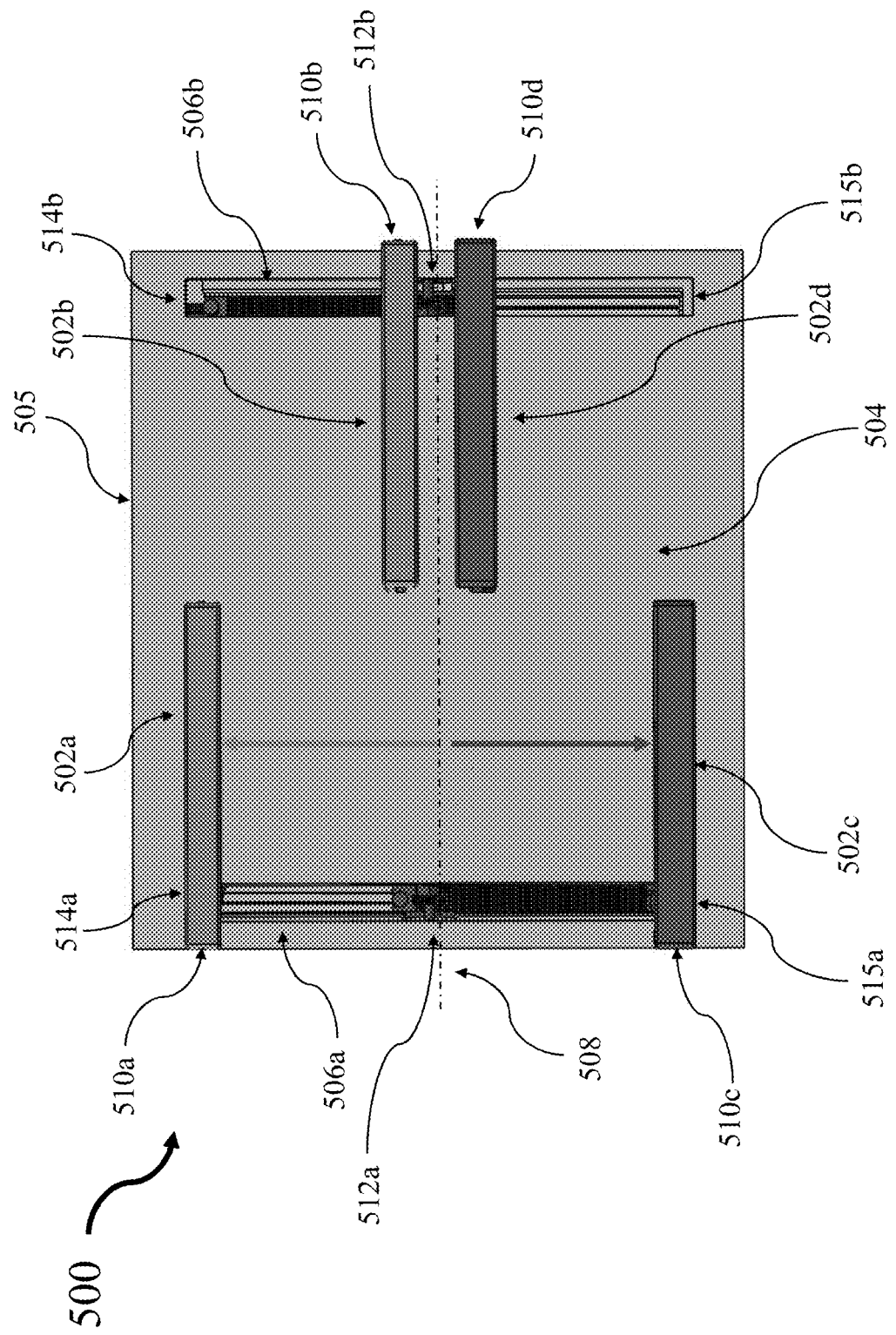
FIG. 5 illustrates various features of an example a multi-device wireless charger implementing a plurality of spring-loaded sliding armatures, according to aspects of the present disclosure.

According to various aspects of the present disclosure, FIG. 5 illustrates an example multi-device wireless charger 500 that includes a plurality of sliding armatures, such as sliding armatures 502a-502d, secured to a charging surface 504, wherein charging surface 504 may be disposed within a housing structure 505. Similar to charging surface 104, as illustrated in FIG. 1, charging surface 504 may be configured to wirelessly charge multiple different wirelessly chargeable devices that have disparate shapes and/or employ differing packaging or other features via placement on or near charging surface 504. Specifically, charger 500 may be configured such that a receiving coil or other induction receiving feature included in the wirelessly chargeable device may be secured in direct alignment over a transmitting coil or other induction transmitting feature included in charger 500 by sliding armatures 502a-502d. Thus, charger 500 may allow for more efficient wireless charging of a variety of different wirelessly chargeable devices.

Sliding armatures 502a and 502c may be may be securably fixed to charging surface 504 via a channel 506a, wherein sliding armatures 502b and 502d may be securably fixed to charging surface 504 via channel 506b. Channels 506a and 506b may be comprised of approximately linear recesses, wherein channels 506a and 506b may be approximately parallel, wherein channels 506a and 506b may be positioned near opposite edges of charging surface 504, as shown in FIG. 5. Sliding armatures 502a and 502c may constitute a first pair of cooperating sliding armatures, wherein sliding armatures 502b and 502d may constitute a second pair of cooperating sliding armatures. In one example, the first pair of cooperating sliding armatures may operate independently from the second pair of cooperating sliding armatures. However, it is also possible that the first and second pairs of cooperating sliding armatures may also be configured to be coordinated.

In one example, such as the example illustrated in FIG. 5, sliding armatures 502a-502d may be rectangular in cross section, wherein each of the sliding armatures 502a-502d further comprises fixed ends 510a-510d. Fixed end 510a of sliding armature 502a may be configured to engage channel 506a, such that sliding armature 502a may be movably positioned between a center point 512a, wherein point 512a may be defined by where a center line 508 bifurcates channel 506a, and a first outer point 514a, wherein outer point 514a may be defined by a first end edge of channel 506a. Similarly, fixed end 510c of sliding armature 502c may also be configured to engage channel 506a, such that sliding armature 502c may be movably positioned between center point 512a and a second outer point 515a, wherein second outer point 515a may be positioned on the opposite end edge of channel 506a. Sliding armatures 506a and 506c may be configured such that they move evenly in opposite directions relative to each other and relative to central axis 508.

Conversely, sliding armatures 502b and 502d may be configured similarly to sliding armatures 502a and 502c, except that sliding armatures 502a, 502b may be configured to engage channel 506b. For example, fixed end 510b of sliding armature 502b may be movably positioned between a center point 512b, wherein point 512b may be defined by where the center line 508 bifurcates channel 506b, and an first outer point 514b, wherein outer point 514b may be defined by a first end edge of channel 506b. Similarly, fixed end 510d of sliding armature 502d may also be configured to engage channel 506b, such that sliding armature 502d may be movably positioned between center point 512b and a second outer point 515b, wherein second outer point 515b may be positioned on the opposite end edge of channel 506b. Sliding armatures 506b and 506d may be configured such that they move evenly in opposite directions relative to each other and relative to central axis 508.

Sliding armatures 502a-502d may be configured to be movably positioned by a spring force mechanism, such that the spring force mechanism may result in each of the sliding armatures 502a-502d being at rest when positioned approximately adjacent to center line 508. However, in another example, sliding armatures 502a-502d may be movably positioned by any other suitable biasing member or other biasing mechanism or system of mechanisms that may generate a force biasing the armatures 502a-502b each toward center line 508. Consequent of the force generating mechanism employed, when sliding armatures 502a and 502c are movably positioned away from center line 508, sliding armatures 502a and 502c may apply a securing force on an object placed between them. For example, if a wirelessly chargeable device is positioned between sliding armatures 502a and 502c, sliding armatures 502a and 502c may apply compressive force toward the centerline such that the wirelessly chargeable device is secured between sliding armatures 502a and 502c on charging surface 504. The same process may be employed with sliding armatures 502b and 502d, such that two different wirelessly chargeable devices may contemporaneously be secured to charging surface 504. Further, because sliding armatures 502a and 502c operate independently of 502b and 502d, each respective pair of sliding armatures may accommodate wirelessly chargeable devices of differing sizes and/or shapes.

Figure 6:
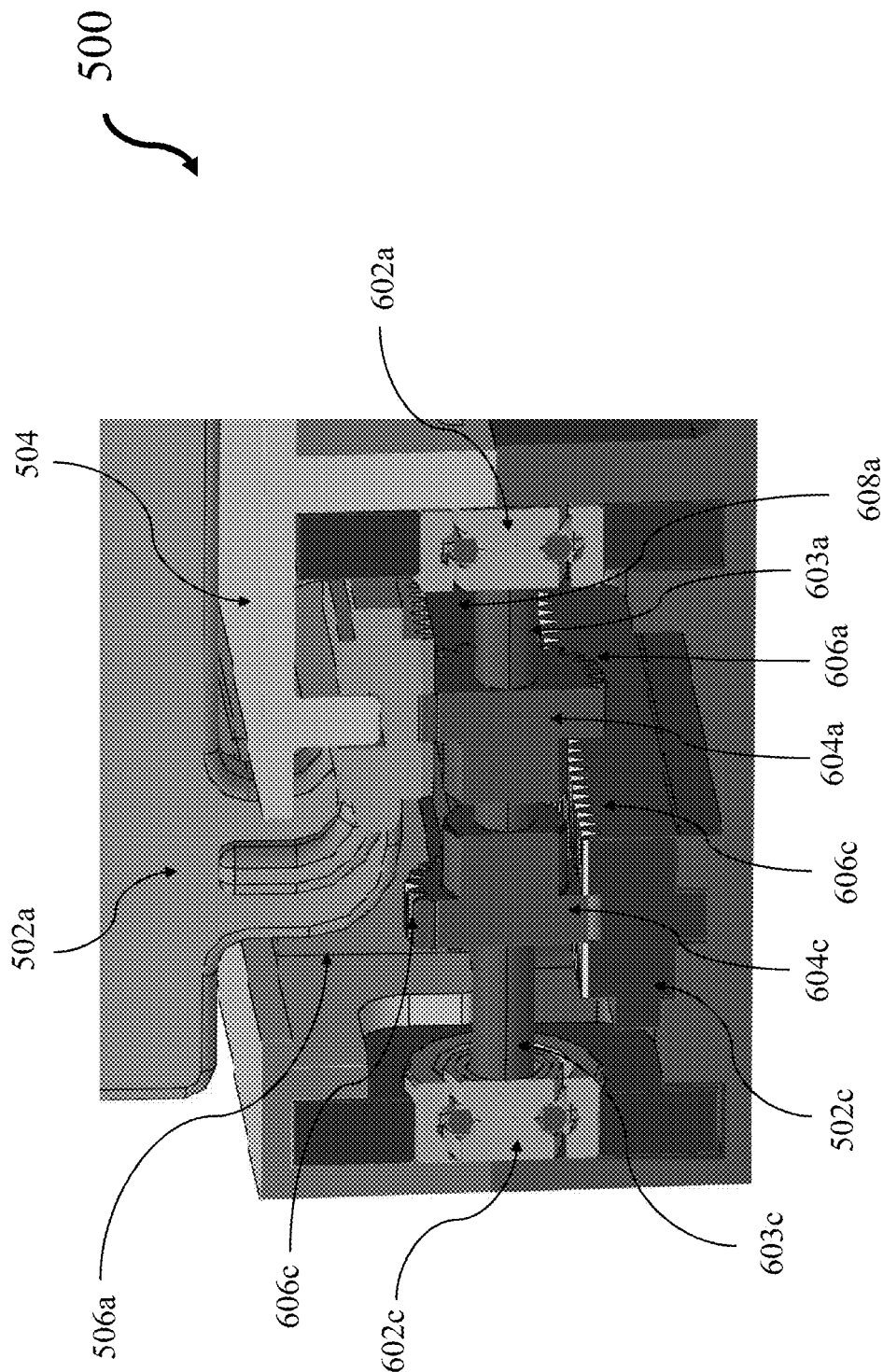
FIG. 6 illustrates a cross-sectional perspective view of portions of the example multi-device wireless charger of FIG. 5, according to aspects of the present disclosure.

FIG. 6, according to various aspects of the present disclosure, shows various features illustrating the mechanics of the movably positionable sliding armatures 510a and 510c in a cross-sectional, close-up, perspective view. Sliding armatures 510a and 510c as shown in FIG. 6 include come portions located beneath charging surface 504 of the example multi-device wireless charger 500. In FIG. 6, sliding armature 502a may interoperate with a first bearing 602a via a first shaft portion 603a about which a first gear 604a may revolve. Similarly, a portion of sliding armature 502c may be engageable with a second gear 604c, which revolves about second shaft portion 603c, second shaft portion 603c in turn interoperating with second bearing 602c. First gear 604a may include a plurality of extending teeth 606a, wherein teeth 606a may be engageable with a plurality of corresponding extending teeth extending from sliding armature 502a. Similarly, second gear 604c may include a plurality of extending teeth 606c, wherein extending teeth 606c may be engageable with a corresponding plurality of extending teeth 608c of sliding armature 502c. Thus, when gears 604a and 604c are rotated via a force applied to corresponding sliding armatures 502a and 502c, the positioning of sliding armatures 502a and 502c relative to one another is synchronized. Further, in one example, bearings 602a and 602c, shaft portions 603a and 603c, and gears 604a and 604c may be positioned directly underneath channel 506a, as shown in FIG. 6. However, in another example, bearings 602a and 602c, shaft portions 603a and 603c, and gears 604a and 604c may be positioned within the recess of channel 506a. Though not visible in FIG. 6, sliding armatures 502b and 502d may be similarly configured within channel 506b with corresponding bearings, shafts, and gears, similarly to as described above.

Figure 7:
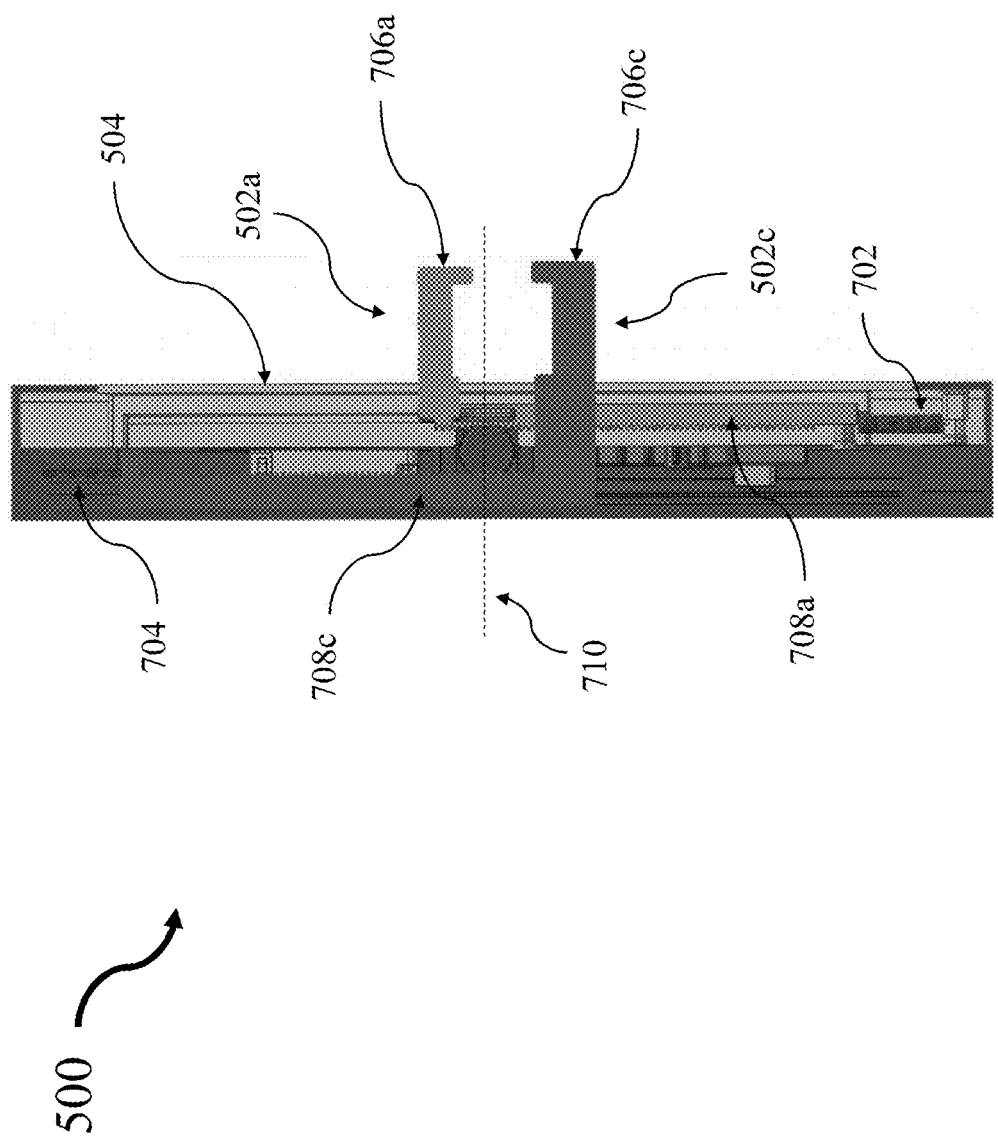
FIG. 7 illustrates a cross-sectional side view of the example multi-device wireless charger with a plurality of spring-loaded sliding armatures, according to aspects of the present disclosure.

According to aspects of the present disclosure, FIG. 7 illustrates a cross-sectional side view of various features of an example multi-device wireless charger 500, in accordance with aspects of the present disclosure. Similarly to as illustrated in FIG. 5 and FIG. 6, in FIG. 7, charger 500 includes sliding armature 502a and sliding armature 502c shown in rest positions located approximately near center line 710, wherein sliding armatures 502a includes a surface side interactive portion 706a and sliding armature 502c includes a surface side interactive portion 706c, wherein interactive portions 706a and 706c are positioned above or on top of the surface of wireless charging surface 504. Interactive portions 706a and 706c may be configured to interoperate with a plurality of different wirelessly chargeable devices, such as tablets, smart phones, or ear bud chargers. Further, sliding armature 502a may also include a force generating portion 708a, and sliding armature 502c may include a force generating portion 708c, wherein portions 708a and 708c are located below or on the opposite side of wireless charging surface 504 relative to portions 7061, 706c. Portions 708a and 708c may extend approximately half of the length of the charger 500, such that portions 708a and 708c may provide stability with regard to interactive portions 706a and 706c. Additionally, portions 708a and 708c may be configured with engageable teeth, such that the movement of sliding armatures 502a and 502c are coordinated to be contemporaneous via operation of one or more toothed wheels having corresponding teeth engageable therewith. Though not illustrated in FIG. 7, charger 500 may also include an a similar arrangement as described above with regard to sliding armatures 502b and 502d (not illustrated in FIG. 7). Further, charger 500 may include a return spring 702, wherein return spring 702 may be configured to generate a force that biases sliding armature 502a towards center line 710. Similarly, charger 500 may also include a return spring 704, wherein return spring 704 may be configured to generate a force that biases sliding armature 502c towards center line 710. Though not illustrated in FIG. 7, charger 500 may also include additional return springs, one of which may interoperate with sliding armature 502b, and another of which may interoperate with sliding armature 502d, similar to the operation of return springs 702 and 704 as described above.

According to aspects of the present disclosure, FIGS. 8A-8D illustrate views of a variety of examples of wirelessly chargeable devices engaged with the example multi-device wireless charger 500 of FIG. 5. Specifically, FIG. 8A illustrates a first configuration that includes a single engaged smart phone device 802. In FIG. 8A, device 802 may be secured relative charger 500 via securing compressive interoperation of both sliding armature 502a and sliding armature 502c. Thus, FIG. 8A illustrates an example implementation of charger 500, wherein charger 500 may be capable of charging a single wirelessly chargeable device.

FIG. 8B illustrates a second configuration that includes an example smart phone device 804 and an earbud charging device 806 each located in positions to be charged. In the configuration of FIG. 8B, device 804 may be secured relative to charger 500 by being received between sliding armature 502a and sliding armature 502c. Further, as shown in FIG. 8B, device 806 may be secured relative to charger 500 between sliding armature 502b and sliding armature 502c via the force applied by a gear or other similar force applying mechanism, similar to as described above in relation to FIGS. 5 and 6. It is noted that the converse may also be implemented, such that device 806 may be secured by sliding armature 502a and sliding armature 502c and device 804 may be secured by sliding armature 502b and sliding armature 502d. FIG. 8B thus illustrates an example implementation of charger 500, wherein charger 500 may be capable of contemporaneously charging two wirelessly chargeable devices that employ differing sizes of device and/or packaging.

FIG. 8C illustrates a third configuration that includes securable location of a first smart phone device 808 and a second smart phone device 810 relative to charger 500. In the configuration of FIG. 8C, device 808 may be secured within charger 500 via interoperation with sliding armature 502a and sliding armature 502c. Further, device 810 may be secured relative to charger 500 via the contemporaneous compression of sliding armature 502b and sliding armature 502d. Similar to the configuration of FIG. 8C, it is noted that the converse implementation may also be practiced, such that device 810 may be secured by sliding armature 502b and sliding armature 502d and device 810 may be secured by interoperating with both sliding armature 502a and sliding armature 502c and the force applied thereby. FIG. 8C thus illustrates an example implementation of charger 500, wherein charger 500 may be capable of contemporaneously charging two similar or identical wirelessly chargeable devices.

FIG. 8D illustrates a fourth configuration that includes a single tablet device 812. In FIG. 8D, device 812 may be secured relative to charger 500 via interoperation with sliding armatures 502a-502d, such that device 812 is secured relative to the charging surface by the force applied between each set of sliding armatures, the set including the cooperating pair of sliding armatures 502a and 502c, and the cooperating pair of sliding armatures 502b and 502d. Thus, FIG. 8D illustrates an example implementation of charger 500, wherein charger 500 may be capable of charging a single wirelessly chargeable device comprising a large size and/or packaging.

It is noted that the configurations of FIGS. 8A-8D respectively, are not meant to be a restrictive or limiting description of all potential configurations or implementations of charger 500. Instead, the configurations shown in FIGS. 8A-8D are meant to be viewed as examples only. For example, charger 500 may also contemporaneously interoperate with two wirelessly chargeable earbud charging devices.

According to various aspects of the present disclosure, FIG. 9A-9C illustrate sequential views of interoperation of a wirelessly chargeable device with charger 500 of FIG. 5.

The sequential views involve placing a mobile device 910 in contact with sliding armature 502c (FIG. 9A). Then, the device 910 may be pushed against sliding armature 502c, such that sliding armature is displaced (FIG. 9B). Following, the opposite end of device 910 may be placed in contact with sliding armature 502a such that device 910 is secured between sliding armature 502a and sliding armature 502c, so as to be fixed relative to charger 500 (FIG. 9C).

Figure 10:
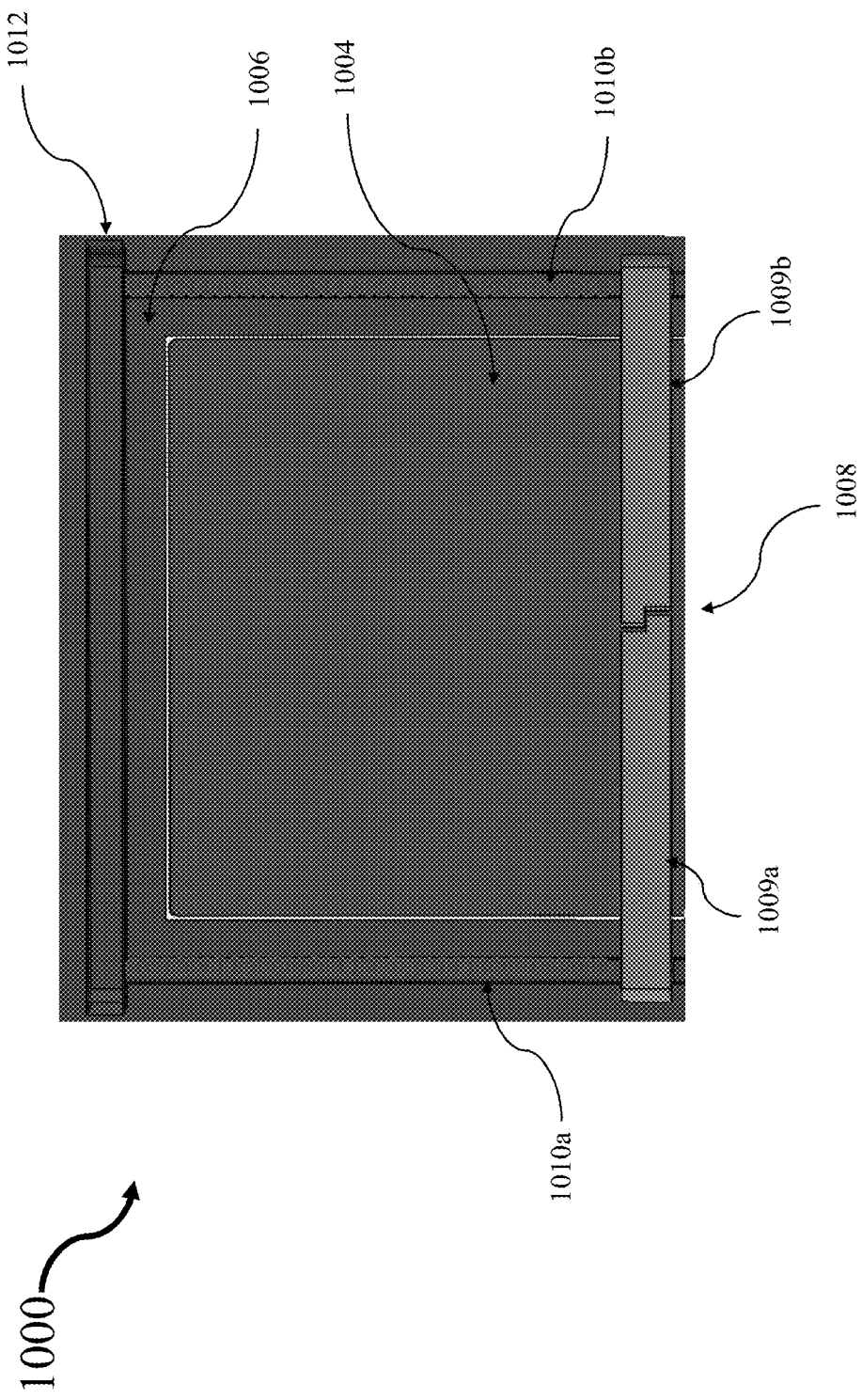
FIG. 10 illustrates a top view of an example multi-device wireless charger implementing a vertical spring-loaded pinching mechanism, in accordance with aspects of the present disclosure.

FIG. 10, according to various aspects of the present disclosure, illustrates a top view of another example multi-device wireless charger 1000, wherein charger 1000 may be configured to interoperate with a plurality of wirelessly chargeable devices via a vertical spring-loaded pinching mechanism. In this example, charger 1000 may include a charging surface 1004 disposed on housing 1006. Housing 1006 may comprise a sufficiently rigid structure, including materials such as glass, metal, or plastic, to protect a plurality of electronic components that enable wireless charging capabilities, similar to technology components 112 of FIGS. 1-2. Charging surface 1004 may be configured to facilitate wireless charging via electromagnetic induction.

Further, charger 1000 may include a sectioned rib 1008 on one end of charging surface 1004 and a stabilizing member 1012 positioned on the charger 1000 on the opposite end of charging surface 1004. Sectioned rib 1008 may include a first rib portion 1009a and a second rib portion 1009b, wherein the rib portions 1009a and 1009b are each configured to slide relative to charging surface 1004. The rib portions 1009a, 1009b may be biased relative to stabilizing member 1012 via a first spring or other similar biasing device 1010a and a second spring or other similar biasing device 1010b, respectively. However, in another example implementation, the biasing generated by springs 1010a and 1010b may be replaced by another biasing component, such as rubber-band mechanism. As shown in FIG. 10, first spring or other similar biasing device 1010a may be attached to rib portion 1009a so as to provide a biasing force relative to stabilizing member 1012 (e.g., to secure a wirelessly chargeable device therebetween). Similarly, second spring or other similar biasing device 1010b may be attached to rib portion 1009b so as to provide a biasing force relative to member 1012. In one example implementation, rib portions 1009a and 1009b may be aligned with each other to jointly secure a device to be charged therebetween. However, in another example implementation, rib portions 1009a and 1009b may be used independently of one another, such that one may not be aligned with the other during use. The variability in positioning of rib portions 1009a and 1009b may allow for charger 1000 to interoperate with at least two wirelessly chargeable devices of different sizes or shapes, for example, whereby one device is secured by one of the two positionable rib portions 1009a, 1009b, and another device is secured by the other of the two positionable rib portions 1009a, 1009b.

Figures 11A, 11B:
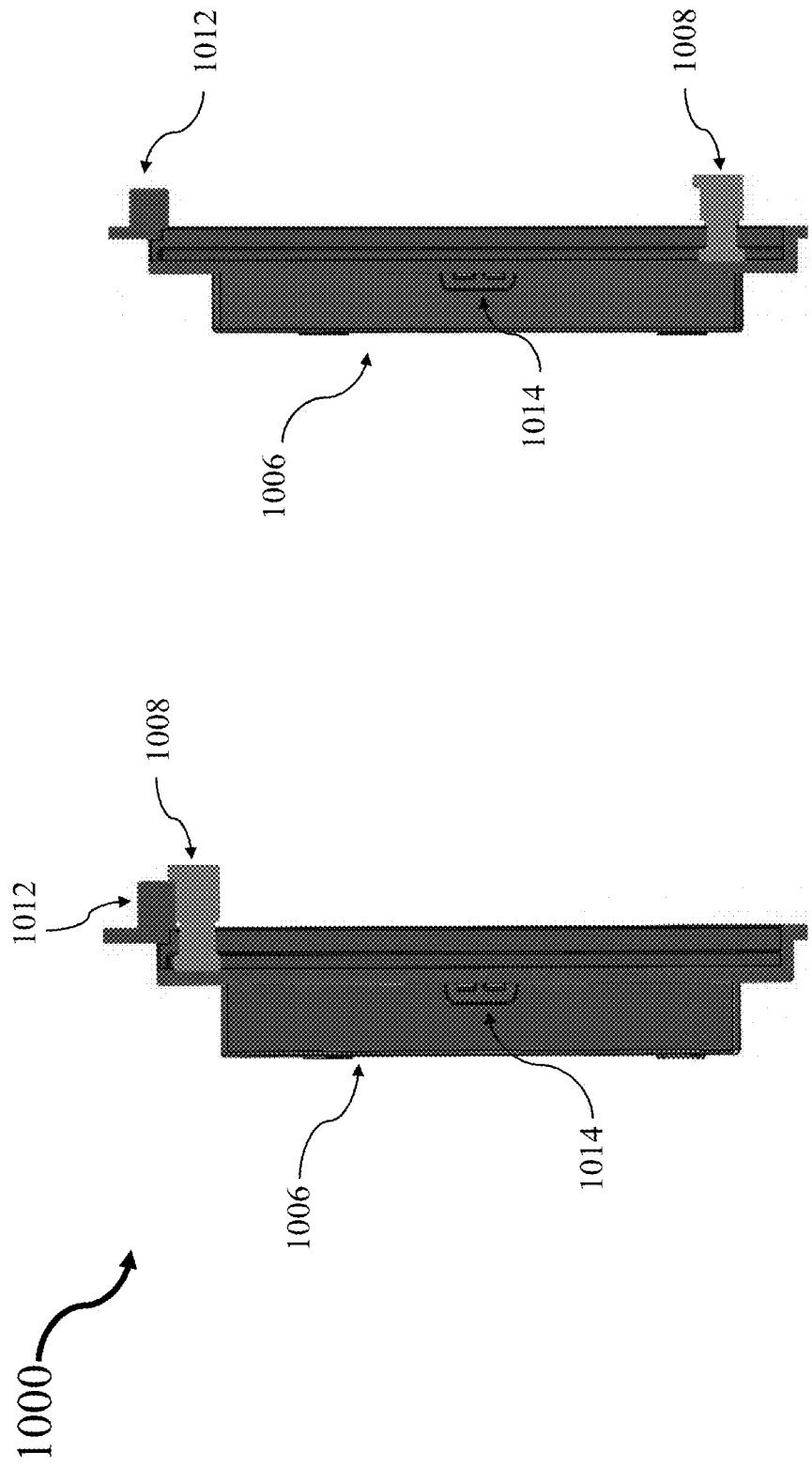
FIG. 11A illustrates a side view of the example multi-device wireless charger with a spring-loaded sliding mechanism of FIG. 10 shown in a closed position, according to aspects of the present disclosure.
FIG. 11B illustrates a side view of the example multi-device wireless charger with a spring-loaded sliding mechanism of FIG. 10 shown in an open position, according to various aspects of the present disclosure.
Figure 12:
FIG. 12 illustrates a side view of the example multi-device wireless charger with a spring-loaded sliding mechanism of FIG. 8 with the mechanism shown positioned to retain two disparate devices, according to aspects of the present disclosure.

According to various aspects of the present disclosure, FIG. 11A illustrates a side view of example multi-device wireless charger 1000 of FIG. 10 in a closed position, and FIG. 11B illustrates a side view of the charger 1000 of FIG. 10 in an open position. In the closed position, charger 1000 may not be interoperating with wirelessly chargeable devices, for example, while in an open position, charger 1000 may be interoperating with wirelessly chargeable devices. Further, in order for device 1000 to be positioned in an open position, rib 1008 may need to be extended away from stabilizing member 1012, opposite the biasing force generated by springs or other similar biasing devices (not illustrated), such as springs or other similar biasing devices 1009a and 1009b of FIG. 10, in order to enable insertion of a wirelessly chargeable device therebetween. Further, FIGS. 11A and 11B both also illustrate clip 1014 disposed within housing structure 1006. FIG. 12 illustrates an overhead view of the charger 1000 of FIG. 10, wherein charger 1000 is shown in a configuration in which it may contemporaneously interoperate with a first mobile device 1202 and a second mobile device 1204, wherein device 1202 and 1204 have differing sizes and/or shapes.

Figure 13A:
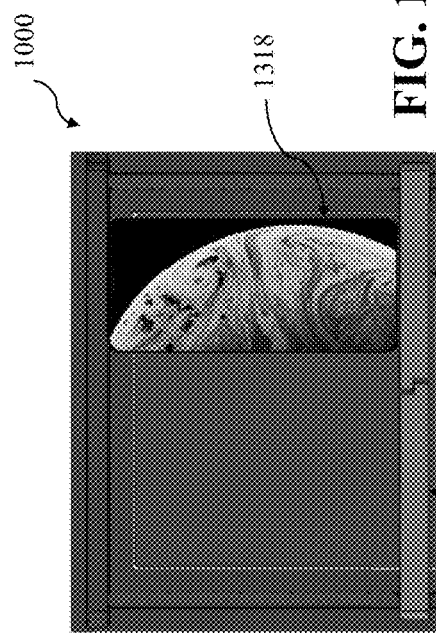
FIGS. 13A-13D illustrate example views of multiple wirelessly chargeable devices being used with the example multi-device wireless charger of FIG. 10, according to aspects of the present disclosure.

According to various aspects of the present disclosure, FIGS. 13A-13D illustrate a plurality of wirelessly chargeable devices interoperable with example multi-device wireless charger 1000 of FIG. 10, in a variety of configurations. FIG. 13A illustrates a first configuration that includes a single tablet device 1310. In FIG. 13A, device 1310 may be secured via the extension of both rib portions 1009a and 1009b. Thus, configuration 1302 allows for charger 1000 to wirelessly charge a larger wirelessly chargeable device, such as a tablet.

Figure 13C:
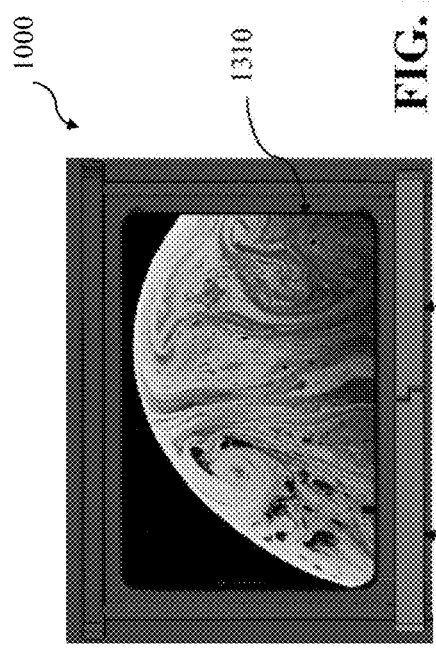
Figure 13D:
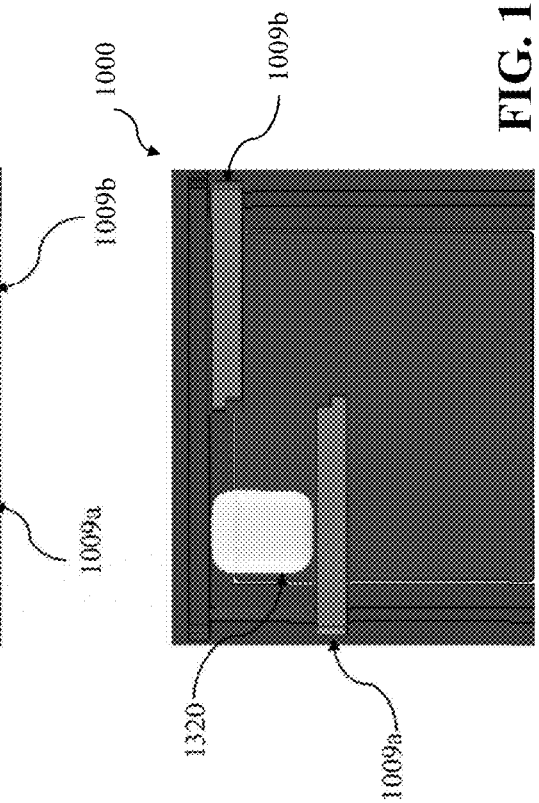
Figure 13B:
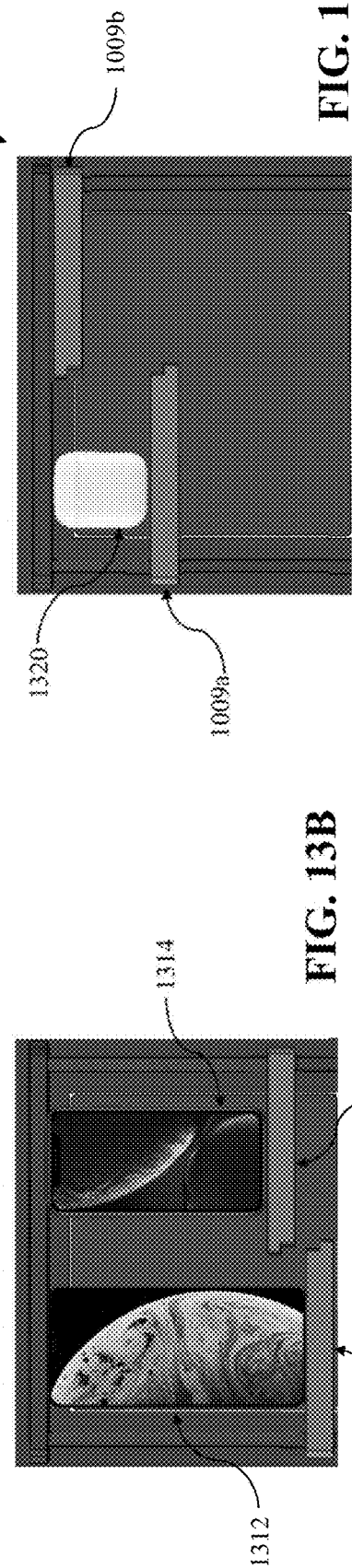

FIG. 13B illustrates a second configuration that includes a first smart phone device 1312 and a second smart phone device 1314, wherein devices 1312, 1314 each have differing sizes, according to various aspects of the present disclosure. In FIG. 13B, device 1312 may be secured within charger 1000 via the force exerted by spring or other similar biasing device 1010a, when device 1312 interoperates with rib portion 1009a. Similarly, device 1314 may be contemporaneously secured within charger 1000 via the force extended by spring or other similar biasing device 1010b, when device 1314 interoperates with rib portion 1009b.

According to various aspects, FIG. 13C illustrates a third configuration that includes a single smart phone device 1318. In FIG. 13C, device 1318 may be secured within charger 1000 via either spring or similar biasing device 1010a or 1010b, whereby device 118 interoperates with either rib portion 1009a or rib portion 1009b, respectively. The configuration of FIG. 13B illustrates that it is not necessary for both rib portions 1009a, 1009b to be engaged contemporaneously during use of charger 1000.

Lastly, according to various aspects of the present disclosure, FIG. 13D illustrates a fourth configuration that includes a single earbud charging device 1320. In FIG. 13D, device 1320 may be secured within charger 1000 via the force exerted by either spring 1010a or 1010b, when device 1320 interoperates with either rib portion 1009a or rib portion 1009b. Though FIG. 13D illustrates a single device 1320, this illustration is not limiting, and there are other example configurations that may involve more than one earbud charging device, or contemporaneously wirelessly charging an earbud charging device and a smartphone, etc. Further, FIGS. 13A-13D are not meant to be a restrictive or limiting in description of all potential configurations or implementations of charger 1000. Instead, the configurations of FIGS. 13A-13D are meant to be only examples. For example, charger 1000 may also contemporaneously interoperate with two wirelessly chargeable earbud charging devices, though such implementation is not illustrated.

FIGS. 14A-14D, according to various aspects of the present disclosure, illustrate sequential views of interoperation of a wirelessly chargeable device with charger 1000 of FIG. 10. The sequential views involve placing a mobile device 1410 in contact with rib 1008 (FIG. 14A). Then, the device 1410 may be pushed against rib 1008, such that rib 1008 is displaced (FIG. 14B). Following, the opposite end of device 1410 may be placed in contact with stabilizing mechanism 1012 (FIG. 14C), such that device 1410 is pinched between rib 1008 and stabilizing mechanism 1012, securing device 1410 within charger 1000 (FIG. 14D).

Figure 15:
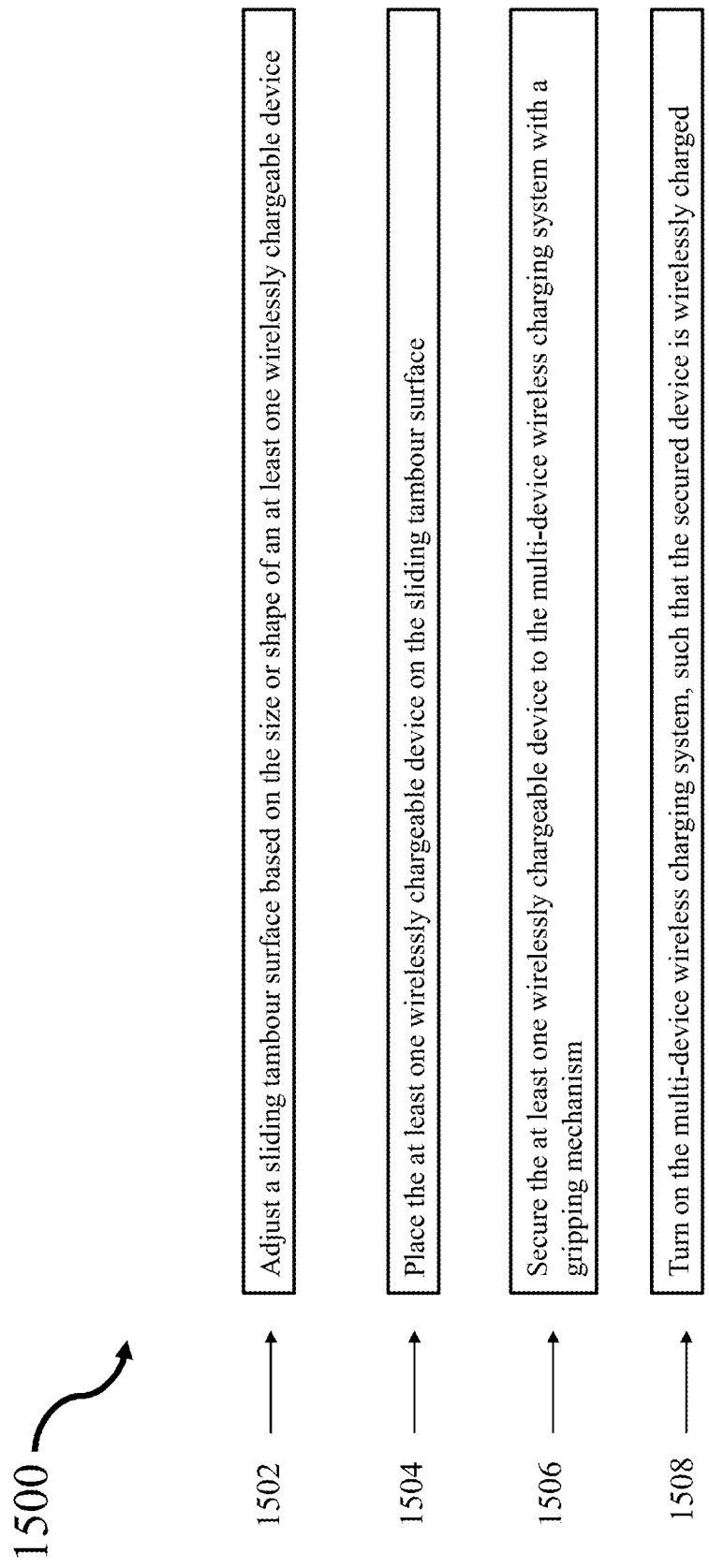
FIG. 15 illustrates a flow chart describing various portions of a method of using a multi-device wireless charger, according to aspects of the present disclosure.

According to various aspects of the present disclosure, FIG. 15 illustrates example elements of a method 1500 for using a multi-device wireless charging system, wherein the method 1500 may include adjusting a tambour sliding surface using a protruding member relative to a charging surface located underneath the tambour sliding surface 1502. Then, the method 1500 may include placing at least one wirelessly chargeable device on the tambour sliding surface 1504 and then securing the at least one wirelessly chargeable device within the multi-device wireless charging system with a gripping mechanism 1506. The gripping mechanism may be or include, for example, a clip, band, or other similar mechanism configured to secure the wirelessly chargeable device. Finally, the multi-device wireless charging system may be turned on via a power switch in order to begin charging the wirelessly chargeable device 1508.

Figure 16:
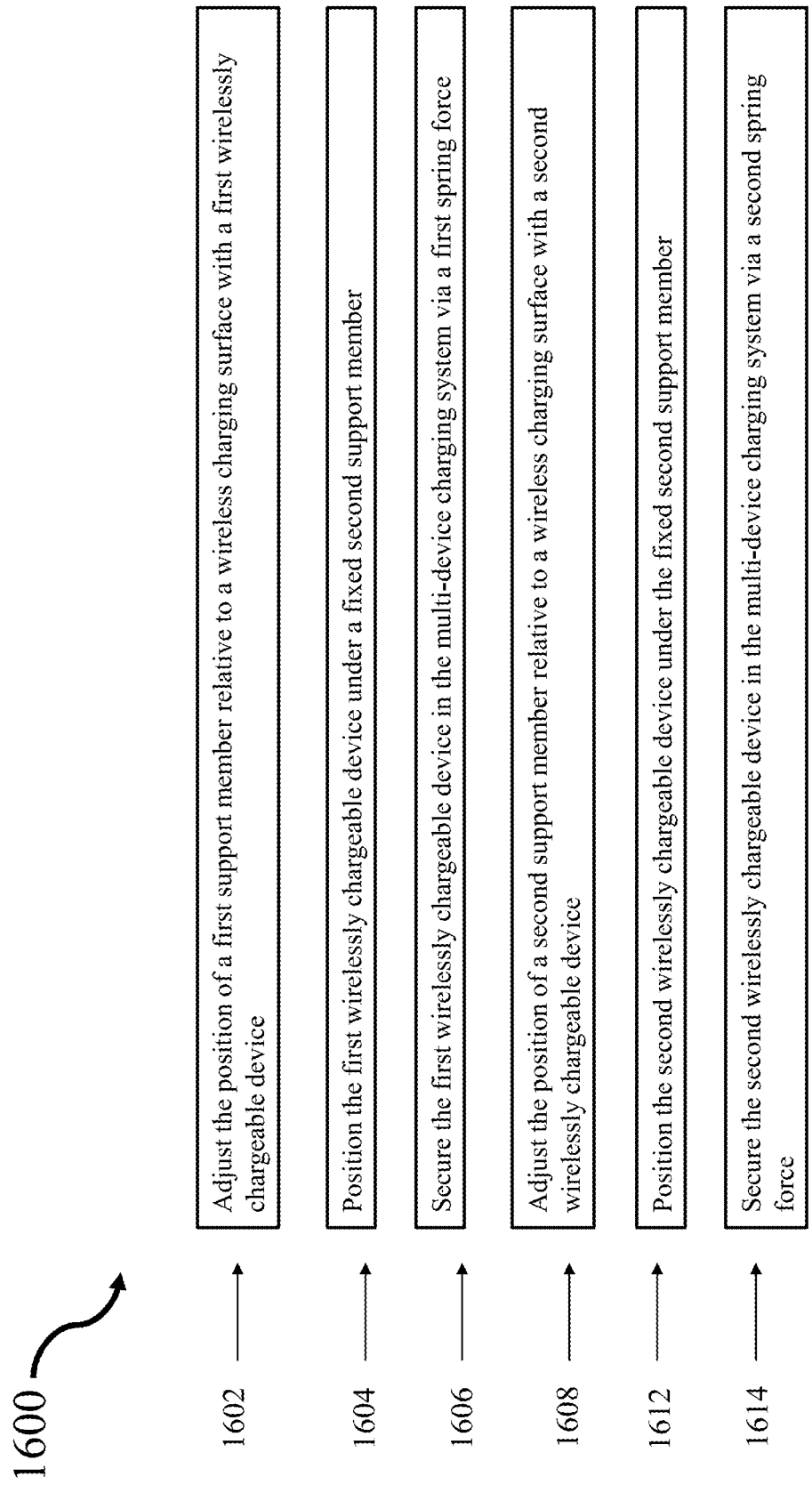
FIG. 16 illustrates a flow chart describing various portions of a method of using a multi-device wireless charger, according to aspects of the present disclosure.

According to various aspects of the present disclosure, FIG. 16 illustrates example elements of a method 1600 for using a multi-device wireless charging system. Method 1600 may first include adjusting the position of a first support member relative to a wireless charging surface with a first wirelessly chargeable device 1602. Following, the first wirelessly chargeable device 1604 may be positioned under a fixed second support member. Method 1600 may continue by securing the first wirelessly chargeable device in the multi-device charging system via a first spring force or biasing force 1606. Method steps 1602-1506 may then be repeated with a second wirelessly chargeable device, if needed. For example, the position of a second support member may be adjusted relative to the wireless charging surface with a second wirelessly chargeable device 1608. Then, the second wirelessly chargeable device may be positioned under the fixed second support member 1612. Method 1600 may then conclude when the second wirelessly chargeable device is secured in the multi-device charging system via a second spring force or biasing force.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A multi-device wireless charging system, the system comprising:
    a housing structure, the housing structure including a charging surface, wherein the charging surface is configured to wirelessly charge at least one compatible wirelessly chargeable device;
    an adjustable securing feature, the adjustable securing feature configured to be interoperable with the charging surface, such that the adjustable securing feature facilitates engagement of the charging surface with the at least one compatible wirelessly chargeable device, wherein the adjustable securing feature is a sliding tambour surface; and
    a first gripping mechanism, the first gripping mechanism being fixed to the housing structure or the charging surface and interoperable with the adjustable securing feature, wherein the first gripping mechanism is configured to facilitate the at least one compatible wirelessly chargeable device being retained relative to the multi-device wireless charging system directly on the sliding tambour surface, wherein the first gripping mechanism is a clipping member.

2. The multi-device wireless charging system of claim 1, further comprising:
    a second gripping mechanism, the second gripping mechanism being attached to the housing structure and configured to secure the multi-device wireless charging system to a surface in an environment for which the multi-device wireless charging system is employed.

3. The multi-device wireless charging system of claim 2, wherein the second gripping mechanism is a clip.

4. The multi-device wireless charging system of claim 1, wherein the at least one compatible wirelessly chargeable device is selected from a group consisting of a tablet, a telephone, a smart phone, a music playing device, a smart watch, earbuds, and an earbud charging case.

5. The multi-device wireless charging system of claim 1, further comprising:
    a power switch, the power switch being configured to power on and power off charging capabilities of the multi-device wireless charging system.

6. The multi-device wireless charging system of claim 1, wherein the sliding tambour surface further comprises a protrusion, the protrusion being configured to aid positioning of the sliding tambour surface.

7. The multi-device wireless charging system of claim 6, wherein the protrusion is a rib, and wherein the rib bifurcates the sliding tambour surface.

8. The multi-device wireless charging system of claim 1, wherein the adjustable securing feature and the first gripping mechanism each comprise at least two pairs of cooperating sliding armatures, each of the sliding armatures including:
- an interactive portion, the interactive portion being positioned above the charging surface;
- a force generating portion, the force generating portion being positioned below the charging surface; and
- a biasing device, the biasing device being configured to be interoperable with the force generating portion.

9. The multi-device wireless charging system of claim 8, wherein the biasing device includes a gear mechanism interoperable with the force generating portion.

10. The multi-device wireless charging system of claim 8, wherein the biasing device includes a spring.

11. The multi-device wireless charging system of claim 9, wherein the gear mechanism further comprises a first plurality of extending teeth and the force generating portion further comprises a second plurality of extending teeth, wherein the first plurality of extending teeth are configured to be operably engageable with the second plurality of extending teeth.

12. The multi-device wireless charging system of claim 1, wherein the adjustable securing feature and the first gripping mechanism each comprise at least two spring-loaded sliding mechanisms, each of the at least two spring-loaded sliding mechanisms comprising:
- a first support member, the first support member interoperable with the housing structure and configured to be adjustable relative to the charging surface;
- a spring, the spring comprising a first end and a second end, wherein the first end of the spring is attached to the first support member; and
- a second support member, the second support member being fixed relative to the housing structure and attached to the second end of the spring, and wherein the second support member is configured to be interoperable with the first support member via the spring.

13. The multi-device wireless charging system of claim 12, wherein the first support member of each of the at least two spring-loaded sliding mechanisms is configured to interlock to each other to form a single support member.

14. A method for using a multi-device wireless charger, the charger including a sliding tambour surface configured to interoperate with at least one wirelessly chargeable device, and a gripping mechanism configured to interoperate with the at least one wirelessly chargeable device, the method comprising:
- adjusting the sliding tambour surface based on a size or a shape of at least one wirelessly chargeable device;
- placing the at least one wirelessly chargeable device on the sliding tambour surface; and
- securing the at least one wirelessly chargeable device to the multi-device wireless charger with the gripping mechanism.

15. The method of claim 13, wherein the at least one wirelessly chargeable device is two wirelessly chargeable devices.

16. The method of claim 14, further comprising:
- turning on the multi-device wireless charger, such that the secured device is wirelessly charged.

\* \* \* \* \*